Feb. 23, 1971
L. R. SMITH
3,566,355
SUPERVISORY CONTROL SYSTEM
Filed March 7, 1968
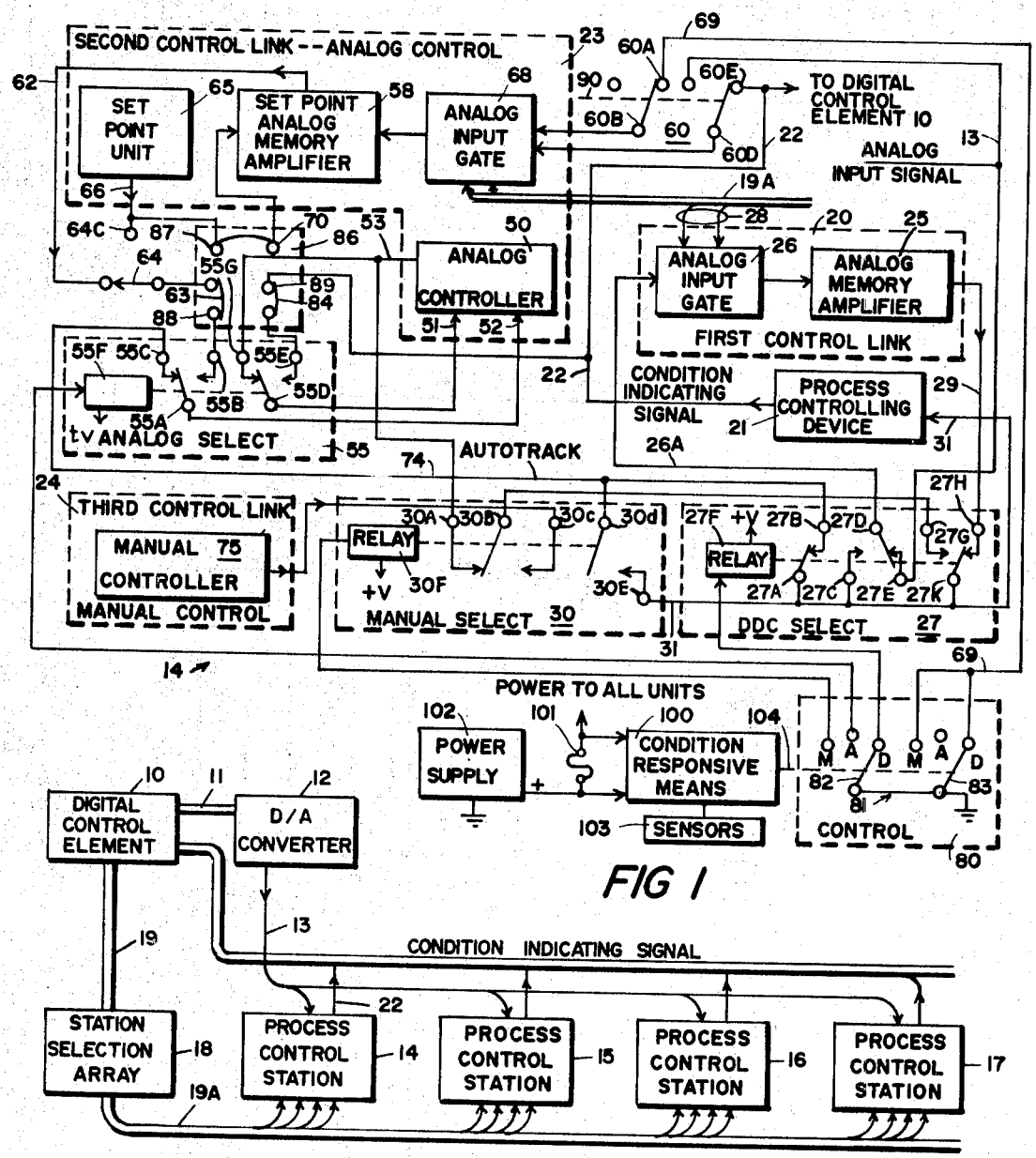
FIG 1
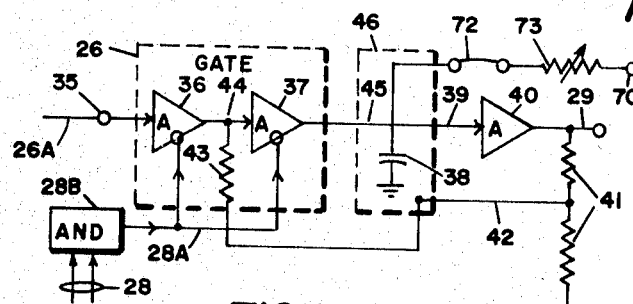
FIG 2
FIG 3
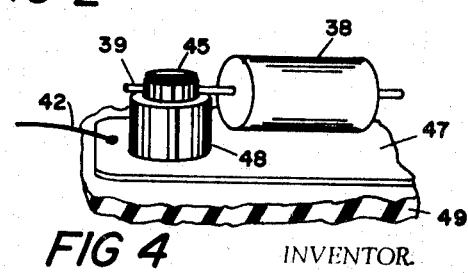
FIG 4
INVENTOR.
Lawrence R. Smith
BY
Mueller, Aichele, & Rauner
Attys United States Patent Office 3,566,355
Patented Feb. 23, 1971

3,566,355
SUPERVISORY CONTROL SYSTEM
Lawrence R. Smith, Phoenix, Ariz., assignor to Motorola, Inc., Franklin Park, Ill., a corporation of Illinois
Filed Mar. 7, 1968, Ser. No. 711,430
Int. Cl. H03f 1/14
U.S. Cl. 340—147                                            4 Claims

ABSTRACT OF THE DISCLOSURE

A supervisory control system having three independent control links. A first one of the control links embodies direct digital control; the second, automatic or semiautomatic analog control; and the third, manual control. Each control link can independently supply a signal to direct a process being controlled. The first control link includes an analog memory amplifier receiving analog signals from a central control unit and supplying an output analog control signal. The second control link comprises a known type analog controller controllable by an analog memory amplifier which is preset during digital control receiving a signal indicating the first controller analog signal as the variable input such that transfer between the first controller and the second controller is "bumpless." The first and second contol links also receive the same variables when the system is under manual control to facilitate bumpless transfer from manual control to analog or digital control. The process-variable signals are returned to a digital control unit which integrates the variables in the system. The analog control signal from a digital control unit is multiplexed to a plurality of process-control stations, each of which has three independent controllers. Address selection is provided.

BACKGROUND OF THE INVENTION

This invention is related to that disclosed in an application of Anthony E. Turner, Ser. No. 711,429 entitled "Supervisory Control System" filed Mar. 7, 1968 and assigned to the same assignee as the subject application.

This invention relates to supervisory control systems and particularly to those systems capable of using direct-digital control, analog control, or manual control.

Supervisory control systems can be characterized as being of two general types. A first and common type is so-called incremental value system, while a second is a true value system. Other terms for the incremental value system are "incremental algorithm" or "velocity algorithm." Another name for the true-value system is "true-position algorithm." In an incremental value system the control signals indicate to a process-controlling device whether to increase, decrease, or make no change. Such signals are repeated until the process-controlling device has changed to the desired position. Expressed in another way, the process-controlling device is the integrator in the system. That is, it sums the control signals to provide a true-control position. In a true-value system, the controlling element generates signals indicating the desired or true value of the process-controlling device. These signals are sent to the process-controlling device and it responds by adjusting itself to such desired value or portion in accordance with its predetermined characteristics. In the true-value system the integrating is accomplished in the controlling element rather than in the process-controlling device. Such a control element may either be analog or digital in character.

In emergency situations, an operator may have to assume manual control of a supervisory control system. In the incremental type of control system, the operator has to exercise control by means of a toggle switch, for example, which would indicate to the process-controlling device to increase or decrease. Such control requires constant attention by the operator. In a true-value system, operator intervention is characterized by the operator adjusting a dial to indicate in some manner the desired true position of the process-controlling device. It does not necessarily require operator attention at all times.

Various control elements for supervisory control systems are divided into two broad categories, digital and analog. As used herein, the term "analog" means a supervisory control system in which the amplitude of electrical signals indicates a numerical value, while the term "digital" indicates that the presence or absence of signals, irrespective of the amplitude, indicates arbitrarily selected numerical values. Such elements may be used in either the incremental value or true-value systems described above. A combination of digital and analog controlling elements are often found in supervisory control systems. For example, digital controlling elements may generate a set of digital signals which are then converted to an analog control signal. Such analog control signal is then utilized as a set point for an analog controller which controls the process controlling device.

An example of a digital unit supplying signals to an analog controller is described by H. S. Tsien et al. in the American Rocket Society Journal, July 1952, pages 192 et seq. in an article entitled "Automatic Navigation of a Long Range Rocket Vehicle." The Tsien et al. system is a true-value system. Similarly, a digital and analog combination is described by Marson in an article entitled "Output and Standby Equipment for Direct Digital Control" in the magazine Control, page 137 et seq., March 1965, FIG. 2. This latter described system is an incremental system.

Digital equipments have many applications in supervisory control systems and many advantages in that insofar as equipment variations are concerned, they are drift free because the information or quantities are represented by discrete signals as opposed to analog signals wherein amplitudes represent values, which are subject to drift and, therefore error. If a digital equipment controlled process is subjected to drift, the digital equipment when programmable can be reprogrammed or the program may be "fixed."

Digital equipment, when used as a computational device, can be much faster than analog devices; thereby a single digital control element, such as a computer, may be time shared by a plurality of analog control devices. This time sharing of the digital control element can improve performance of the system in that if it is programmed, any errors in the logic design or algorithm can be corrected by merely changing the program rather than modifying equipments. For this reason and others, it is desirable to provide a digital control element for a supervisory control system which controls a large plurality of remote process control stations.

If an incremental value system were to be adopted, then the digital control unit computes each increment and supplies it to the analog controller. Further, in an incremental system with the integration being accomplished in an analog device, such analog quantities are subject to drift due to equipment performance. In a true-value system, the digital control element performs the integration and supplies a drift-free control signal.

It is unquestionable that in a true-value system the computation performed in a digital control element will be the most accurate and the most stable. However, digital control elements, as well as connecting control links, are subject to malfunctions. In controlling processes or other operations, it is desirable in several instances to continue operations even though a digital control unit and its communication network are not functioning, are functioning improperly, or have in some manner created an error which would be adverse to the successful performance of the process. Such continuation should not have an adverse affect on system operation.

A low cost process control system utilizing a process digital control element for a large plurality of process control stations, some of which may have a wide geographic distribution, requires a time sharing by the various stations of communication networks and the digital control element. Such time sharing requires a reliable memory capability at each process control station for remembering the control signal. If digital signals are transferred to each station, then such memory capability may be of the digital type. Additionally, each station requires a digital-to-analog converter to effect control over a process parameter. For a truly low cost process control system a single digital-to-analog converter could be located at the central digital control element. Then some system of multiplexing is required to supply a time-shared communication network which carries a sequence of analog control signals to a plurality of process control stations.

SUMMARY OF THE INVENTION

It is an object of the invention to provide an improved process control station with long term electrically alterable electronic storage of analog control signals receivable on a time shared basis.

It is another object of this invention to provide an improved supervisory control system having a digital control element and which has a "bumpless" backup system for assuming control of a control process whenever the digital control unit fails.

It is another object of this invention to provide a high degree of redundancy in control links for a supervisory control system.

It is a further object of this invention to provide pumpless transfer of control between a plurality of control links in a control system.

A feature of this invention includes parallel control links, one of which is digital controlled and another of which automatically follows the process performance and is capable of assuming control of the process upon malfunction of the digital control unit without introducing unnecessary transients into the process. Both control links can track system performance when manual control is being utilized.

Another feature of the invention is the provision of a supervisory control system having an analog memory unit in a direct digital control link and a similar analog memory unit in an analog controller link with the memory unit in the analog link automatically following the process control signal variations as controlled by the direct digital link. All the controlling links can supply similar control signals indicative of the desired condition of the process.

Apparatus incorporating this invention includes a direct digital system for supervisory control when a first analog memory unit receives analog input signals from a digital control element and stores them for an indefinite period of time. The analog memory amplifier continuously supplies an analog control signal indicated by the stored analog signal to a process-controlling device. An analog control link is provided which is connected to the process for receiving and automatically tracking the continuously supplied control signal from the first control link. A second analog memory amplifier continuously receives the process condition indicating signals for storing same. Upon a malfunction in the direct digital control link or for other reasons, condition responsive means switch the control from the digital control link to the analog control link. Input connections to the analog controller are switched to the second analog memory amplifier. The set point input of the analog controller is then received from the second analog memory amplifier while the control input is the process-condition indicating signal. In addition, a manual controller in a manual control link is provided. Switching means capable of selecting any one of the three control links for controlling a process controlling device. All three of the control links are in parallel circuit insofar as the process-controlling device is concerned. A set point unit is connected in parallel with the second analog memory amplifier such that it may be used as an alternate to the second analog memory amplifier.

A digital control element supplies digital controlling signals to a single digital-to-analog converter. An output analog signal from the converter is supplied to a plurality of process control stations. Each process control station receives such analog signals and selectively supplies them to the first analog memory amplifier in each of the respective stations. The converter supplied analog signal is also selectively available to the second analog memory amplifier in each of the process control stations. The process condition indicating signals are supplied from every process control station to the digital control element. Each of the process control stations include gating means which receive station selection signals from the digital control element via a station selection array. These station selection signals open gates for selectively passing analog signals to the analog memory amplifiers in the respective process control stations. In this manner, only one analog signal line need be provided between the D/A converter and a plurality of process control stations. Since a station-selection array is provided adjacent a digital control element, the number of lines between the central station and the plurality of remote stations is equal to twice the square root of the number of remote stations.

THE DRAWING

FIG. 1 is a block diagram illustrating a system incorporating the teachings of the present invention.

FIG. 2 is a block-schematic diagram of a process control station using the teachings of the present invention.

FIG. 3 is a block-schematic diagram of an analog memory amplifier and its input gates usable with the FIG. 1 system.

FIG. 4 is a diagrammatic showing of the connection and support of an analog memory element usable with the FIG. 2 memory system.

DESCRIPTION OF THE ILLUSTRATIVE EMBODIMENT

Like numbers indicate like parts in the various diagrams and view. The FIG. 2 illustrated supervisory control system has a central digital control element 10 having a program for computing true-value signals for use in a supervisory control system. Cable 11 carries digital output signals from digital control element 10 to digital-to-analog converter 12. Converter 12 supplies corresponding analog input signals over line 13 to a plurality of remote process control stations 14, 15, 16, and 17. A much larger plurality of process control stations may be provided. Station 14 is shown in flow-chart form in FIG. 2. It is understood that stations 14–17 may be substantially identical. The process-controlling device in the respective stations may be different or may be identical, depending upon the process being controlled (not shown).

In order to limit the number of wires between the central digital control element 10 and a plurality of remote process control stations, station-selection array 18 decodes digital address signals received over cable 19 from digital control element 10. Station-selection array 18 is merely a decoder for decoding a large number of parallel received signals into a smaller plurality of decoded signals, as is known in the digital and computer communication arts. The decoded signals are supplied over cable 19A to all of the process control stations 14–17.

In station-selection array 18, if there are 100 remote stations, then the maximum number of lines between array 18 and the stations would be 100, i.e., one line for each station. By providing two lines to each station, the number of station-selection lines equals twice the square root of the number of stations, or 20 in this particular example. By providing a complete decoder at each station, the number of lines can be reduced to seven for 100 remote stations. The "trade-off" for building a single array or a large plurality of station decoders versus the cost of the address signal lines is a matter of design choice.

As shown in FIG. 1, the process control station 14 has three control links 20, 23 and 24. The first control link 20 is utilized in what is termed direct digital control in that signals received from digital control element 10 via the digital-to-analog converter 12 directly controls the process-controlling device 21 with the process condition-indicating signal on line 22 being supplied directly to digital control element 10 as well as to selected units within process control station 14. Element 10 has an analog-to-digital converter (not shown) for digitizing the line 22 signal. A second control link 23, also termed the analog control link, is utilized in the present illustration as a backup control link for direct digital control link 20. That is, second control link 23 assumes control of the process in the event first control link 20 is subjected to a malfunction adversely affecting process control or control is switched at the discretion of an operator. The analog control link 23 is in parallel system relationship to direct digital control link 20. A third control link 24 includes manual controller 75 for "hard" manual control in the event of failure or malfunctioning of control links 20 and 23 or for other reasons. To provide bumpless transfer from manual control link 24, during manual control both first and second link 20 and 23 track the analog control signal on line 31 as supplied by manual link 24.

Direct digital control (DDC) link 20 includes analog memory amplifier 25 having an input connection through analog input signal gate 26. The analog input signal supplied by converter 12 over line 13 is continuously supplied to DDC select circuit 27 (later described) and thence selectively to analog input gate 26 over line 26A. When digital control element 10 supplies the converter 12 with an appropriate set of digital control signals to be utilized for adjusting process-controlling device 21, corresponding station selection signals are supplied over cable 19A to a pair of lines 28 to open analog input gate 26 for passing the analog signals then present on line 26A to analog memory amplifier 25. Memory amplifier 25 receives and stores the analog input signal. It also supplies a corresponding analog control signal over line 29 and thence DDC select circuit 27 and output line 31 to process-controlling device 21. This analog control signal is also supplied to analog control link 23, as will be later described, such that the second or analog control link automatically tracks the process control signal during direct digital control.

Analog memory amplifier 25 is illustrated in simplified schematic form in FIG. 3. The analog input signal from DDC select circuit 27 is supplied over terminal 35 through a first input gating stage 36 and thence through second input gating stage 37 to capacitive memory element 38. Input gating stages 36 and 37 each consist of an insulated-gate field-effect transistor (IGFET). The gate electrodes are joined to line 28A, the drain electrodes are the respective input connections to the stages, the source electrodes are the output connections while the substrates are electrically unconnected. When conductive, the IGFET's provide a good signal path between the source and drain electrodes such that the analog input signal is faithfully supplied to memory element 38. AND circuit 28B receives the digital station selection signals on lines 28 and combines them in a known manner into a single digital gate control signal on line 28A. Memory element 38 receives the input analog signal and stores the signal in its capacitance, the signal being represented by a voltage magnitude. Such voltage magnitude is supplied over line 39 to unity-gain output amplifier 40 which has an exceedingly high input impedance. Such high input impedance may be provided by connecting the capacitive memory element 38 to a gate electrode of an insulated gate field-effect transistor. Output amplifier 40 supplies its output signal over line 29. The signal on line 29 is supplied through voltage divider 41, thence over feedback line 42 and resistor 43 to the junction between the input gating stages 36 and 37. Output amplifier 40 is preferred to be a unity-gain amplifier such that when gate 26 is closed (the IGFET's have a high impedance between source and drain electrodes) the output signal on line 29 is supplied to the input of gating stage 37. As gating stage 37 is closed by the digital selection signals on line 28A, any leakage through gating stage 37 to memory element 38 is minimized because the voltage at junction 44 is substantially the same amplitude as the voltage magnitude at junction 45 of memory element 38. In order to maintain a constant voltage across memory element 38, the leakage paths to other portions of the circuit are minimized by a guard plane indicated in FIG. 3 by dashed box 46. This corresponds, as shown in FIG. 4, to a potential plane or metallic layer 47 ohmically connected to feedback line 42 for receiving the output signal. It will be recalled that the output signal is equal or substantially equal in amplitude to the voltage magnitude stored across memory element 38 thereby making essentially zero voltage between junction 45 and metallic layer 47. High quality insulating post 48, being a main leakage path for the voltage stored across memory element or capacitor 38, has substantially zero voltage thereacross for practically eliminating that leakage path. Metallic layer 47 is mounted on high quality insulative board 49 in the usual manner. Metallic layer 47 also prevents additional leakage in the event that capacitor 38, shown in FIG. 4 as a tubular capacitor, inadvertently is pushed against metallic layer 47. Therefore, it is seen that the anolog memory amplifier 25 provides an analog memory with long retentivity.

Referring again to FIG. 1, analog control link 23 includes analog controller 50 of known design having input signal means consisting of a pair of differential input terminals 51 and 52. Its output control signal is supplied over output signal means line 53 to terminal 30A of relay 30F in manual select circuit 30. Relay 30 is termed "manual select" in that when relay 30F is energized manual control link 24 is utilized to control device 21. When relay 30F is not energized either link 20 or 23 is utilized in accordance with the energization of relay 27F in DDC select circuit 27, as later described. The arrangement is such that actuation of relay 27F selects control link 20 for direct digital control of device 21, irrespective of the actuation state of manual select circuit 30.

When relays 27F and 30F are actuated as shown, the direct digital control link 20 adjusts the process controlling device 21. During this type of operation, the analog control signal is supplied by analog memory amplifier 25 through terminals 27H and 27K to output line 31 and thence to process controlling device 21. The analog control signal on line 31 is also supplied to input terminal 52 of analog controller 50 via terminals 27A and 27B of circuit 27 and terminals 55A and 55C of analog select circuit 55. Therefore, during direct digital control, analog controller 50 utilizes the analog control signal on line 31 as one of its input signals. The "autotraking" connections of controller 50 are completed by its output signal on line 53 being supplied to input terminal 51 via terminals 55G and 55D of analog select circuit 55 and as later more fully described.

Control circuit 80 selects which control link will supply the analog control signal to process controlling device 21. Control circuit 80 is schematically shown as having double-pole triple-throw switch 81. With switch arms 82, 83 set to terminals "D," direct digital control link is selected by energization of DDC select relay 27F and the deenergization of manual select relay 30F and select analog relay 55F. Setting switch arms 82, 83 to terminals "A" analog control link 23 is selected to supply the analog control signal over line 31. In this instance, select analog relay 55 is energized while the other two "select" relays 27F and 30F are deenergized. Similarly, by setting switch arms 82, 83 to terminals "M," manual select relay 30F is energized with select relays 27F and 55F being deenergized for selecting manual control link 24 to supply the analog control signal over output line 31. Discussion of fully automatic operation of control circuit 80 appears later.

During analog control operation the process condition-indicating signal is supplied to input terminal 51 while the set point signal is supplied to input terminal 52 of analog controller 50; therefore, during operation of analog control link 23 known analog control techniques are utilized. Such connections are provided by relay 55F being energized to connect input terminal 51 to line 22 via terminals 55D and 55E and jumper 84. Terminal 52 is connected to second analog memory amplifier 58 to receive the stored set point signal indicating the desired or true value operating point of device 21. The circuit includes contacts 55A and 55B of analog select relay 55F, thence through jumper 63, switch 64 and line 62 to memory amplifier 58. The output line 31 is also connected to controller 50 signal output means line 53. Line 53 is connected through terminals 30A and 30B of deenergized manual select relay 30F to alternate control terminal 27G of deenergized DDC select circuit 27, thence via terminal 27K to output line 31. Input signal means terminal 52 is disconnected from output line 31, by action of relay 55F disconnecting terminal 55A from terminal 55C. With these connections, analog controller 58 is connected such that the system operates as shown in FIG. 2 of the Tsien et al. article, supra.

Analog controller 50 has no memory capability and, therefore, once it assumes control of process controlling device 21, it must receive a set point signal. As just described second analog memory amplifier 58 supplies the set point signal. During the control of device 21 by the direct digital control link 20, second analog memory amplifier 58 received the process condition indicating signal over line 22, through switch 60, causing second analog memory amplifier 58 to track the condition indicating signal during direct digital control. In the event of any change over to analog control, the set point supplied to controller 50 by second memory amplifier 58 corresponds exactly to the immediately existing process condition to provide a bumpless transfer with the continuing operation of the process at or substantially at the last computed true value of condition from digital control element 10.

Gate circuit 68 is interposed between switch 60, terminal 60D and second memory amplifier 58. During direct digital control and manual control, a continuous enabling signal is supplied over line 69 via terminals 60A and 60B of switch 60 such that memory amplifier 58 will continuously receive the process condition indicating signal from line 22 via terminal 60D of switch 60. When analog control link 23 is supplying the analog control signal on line 31, switch 60 is set to connect terminal 60D to 60E such that the input analog signal on line 13 is supplied to gate 68 while terminals 60A and 60B are disconnected for closing gate 68. Gate 68 includes internal bias circuits for closing itself in the absence of an opening or enabling control signal. Address signals on lines 19A from station selection array 18 (FIG. 1) open gate 68 in the manner described for gate 26 to selectively pass analog input signals from line 13 to second memory amplifier 58. This connection enables digital control element 10 to control device 21 via link 23. That is, digital control element 10 continues to send out newly computed set points which then are passed to second analog memory amplifier 58 which in turn adjusts the analog controller 50 set point for controller device 21. It will be remembered that digital-to-analog converter 12 only periodically sends out analog control signals over line 13 intended for station 14. At other periods, it sends out analog control signals over line 13 intended for one of the other process control stations 15, 16, or 17. When analog signals are transmitted in a multiplexed communication scheme, a faithful analog memory amplifier is provided at each process control station.

Set point unit 65, of known design, may have a manual or automatic input; for example, set point unit 65 may be a servomotor controlled slide-wire type of unit. It supplies its analog output signal over line 66 to switch 64, terminal 64C. Switch 64 may be a manual switch or a pin board type of connecting link. Switch 64 is used during analog control of device 21 to select either set point unit 65 for furnishing a set point to controller 50 or second analog memory amplifier 58. Set point unit 65 may also be utilized as a backup point of operation in the event there is a malfunction occurring in the control system while analog link 23 is operating device 21 or it is desired to maintain semi-automatic control via set point unit 65. To this end (refer to FIG. 3), a jumper 72 selectively connects junction 45 through variable impedance 73 to terminal 70. Terminal 70 is selectively connected, as shown in FIG. 1, by jumper or connecting link 71 to line 66. As soon as there is a detected malfunction, the two jumpers 68 and 71 are connected as shown in FIGS. 2 and 3. Then the voltage on capacitor 38 is altered during a predetermined period of time determined by the capacitance of 38 and the electrical impedance of variable resistor 73 to a magnitude supplied to line 66 by set point unit 65. Therefore, set point unit 65 provides a dual function in a process control station: (1) it is a backup safe operating point for controlling analog controller 50 through analog memory amplifier 58 with a predetermined time constant for supplying a smooth transition from the signal being supplied over controller output signal means line 53 to a second but different predetermined signal supplied by set point unit 65. This ensures no transients are introduced into the process being controlled by device 21; (2) it supplies the set point signal directly to analog controller 50 through switch 64, pin link 63 and analog select circuit 55.

The third control link 24 is selected when the switch 81 is set to terminals M for enabling manual controller 75 to operate device 21. Manual controllers are well known in the art and this connection is provided for usage only under extreme circumstances. During manual control by link 24 memory amplifiers in control links 20 and 23 automatically track the analog control signal on line 31 as well as the condition-indicating signal on line 22. The manual controller 75 analog control signal on line 31 is supplied through DDC select circuit 27 terminals 27C and 27D and thence over line 26A to analog input gate 26 of control link 20. The digital address signals supplied from the digital control element 10 over lines 28 periodically open analog input gate 26 to pass the analog control signal to analog memory amplifier 25. Alternately a steady-state opening of analog input gate 26 may be provided by suitable connection from control circuit 80 in the same manner as described for the control of analog input gate 68 of analog control link 23. The analog control signal on line 31 is also supplied through manual select circuit 30 terminals 30E and 30D and thence over autotrak line 74 through terminals 55C and 55A of analog select circuit 55 to input terminal 52 of analog controller 50. During this operation the analog controller 50 output signal on line 53 is fed back to input terminal 51 via terminals 55D and 55E of analog select circuit 55. The condition-indicating signal on line 22 is supplied to analog input gate 68 through terminals 60C and 60D of switch 60. With analog input gate 68 being continuously enabled or opened by the signal on line 69, second or set point analog memory amplifier 58 receives and stores the condition-indicating signal. Therefore, upon the release of manual control to either direct digital control through link 20 or analog control of link 23 either fully automatic or semi-automatic as described above, there is provided a bumpless transfer without adjustment or delay.

The selection of a set point signal for analog controller 50 is provided by the various jumpers in pin board circuit 86. For example, jumper 63 connects line 62 (output signal of second analog memory amplifier 58 to the second input signal means terminal 52 of controller whenever analog control link 23 is activated to control device 2). By using a jumper (not shown) between terminals 87 and 88, set point unit 65 directly supplies a set point signal to controller 50. In a similar manner the set point selection into input terminal 52 can be selected to be the condition indicating signal on terminal 89.

Switch 60 may be made an integral part of analog select circuit 55 such that the switch arms of switch 60 are actuated simultaneously with the switching contact arms of relay 55F. With such a modification the switch 60 being set as shown, corresponds to the deenergized condition of relay 55F. Such an actuation connection is indicated by dotted line 90.

To provide automatic switching between the various control links, such as by switch 81 controlling the various select relays 27F, 30F and 55F, condition responsive means 100 is provided. As shown, condition responsive means is connected across fuse link 101 which is in series circuit with the power supply 102 going to all the units of control link 20 in the particular remote control station 14, the detailed connections being omitted for clarity. Each control link may have its own fuse. In the event there is a short circuit or other overload, fuse 101 opens, creating a large voltage from the positive terminal supply 102 to the load side of fuse 101. Voltage detection is well known and is used by condition responsive means 100 to set switch 81 to terminal A for disconnecting control link 20 from and connecting control link 23 to output line 31. Such a condition responsive means may include a spring which normally yieldably urges switch arms 82, 83 to terminal A with an electrically actuated solenoid forcing the switch arms to the terminal. Further condition responsive means may receive actuating signals from sensors 103 for setting switch to one of the link selecting for terminals M, A or D, in accordance with a parameter being sensed. Sensors 103 may include a manual switch in control console of a supervisory control system, for example. Also, it may sense a parameter within the process control station within the process being controlled, operating indicating signals of various units or other parameters arbitrarily selected for controlling the remote control station. Condition responsive means 100 is shown operatively connected to switch arms 82 and 83 by a dotted line 104.

What is claimed is:

1. A process control station for effecting a control function in a process controlling device by supplying a true-value analog control signal over an output line, the device supplying a condition-indicating signal, the improvement including in combination,
   a first control link supplying the analog control signal,
   a second control link having an electronic analog memory amplifying means and an analog controller with an input signal means and an output signal means,
   said second control link receiving at least one of said signals and being responsive to said received signal to adjust said controller to be capable of independently supplying a backup analog control signal substantially identical to said analog control signal supplied by said first link,
   said input signal means consists of first and second input portions and said analog controller output signal means being connected to said first input portion for supplying said backup analog control signal thereto and said output line being connected to said second input portion for supplying said analog control signal thereto, and said electronic analog memory amplifying means receiving said condition-indicating signal, and
   switching means interposed between said electronic analog memory amplifying means and said analog controller for selectively disconnecting said output line and said output signal means from said input signal means and connecting said electronic analog memory amplifying means and said condition responsive signal to said input signal means whereby the signal stored in said electronic analog memory amplifying means is selectively supplied to said analog controller.

2. The station as set forth in claim 1 wherein said second control link further includes a setpoint unit supplying a predetermined analog output signal,
   impedance means coupling said analog output signal to said electronic analog memory amplifying means and switching means for selectively decoupling said condition-indicating signal from said electronic analog memory amplifying means such that the analog signal stored in said memory amplifier is charged to said analog output signal after a predetermined time after decoupling said condition-indicating signals.

3. A process control station, including in combination,
   a first independent control link having an electronic analog memory amplifier with first input signal means for receiving and memory means for storing an analog input signal and supplying an analog control signal in a first output signal means,
   a second independent control link having an analog controller with second output signal means and second input signal means with first and second terminals,
   a third independent control link having a manual controller with third output signal means,
   an output line for carrying an analog control signal,
   switching means for selectively connecting one and only one of said output signal means to said output line at a given time and operative when connecting said third output signal means to said output line to simultaneously connect said first and second input signal means to said output line for causing said first and second control links to receive and track said third independent control link supplied analog control signal, and further operative when connecting said first output signal means to said output line to connect said output line to said second input signal means such that said second independent control link tracks said first independent control link supplied analog control signal.

4. The process control station of claim 3 further including analog input signal means for receiving said analog input signal for said station;
   an autotrak line; and
   wherein said switching means includes control means having first, second and third link selecting terminals,
   a direct digital control circuit means in said switching means having an alternate control terminal and responsive to said control means being set to said first link selecting terminal to connect said output line to said first output signal means, to said second input signal means and to said autotrak line, connect said first input signal means to said analog input signal means, and disconnect said output line from said first signal input means and from said alternate control terminal, and further responsive to said control means being set to either said second or third link selecting terminals to disconnect all connections made and connect all disconnections effected when said control means was set to said first link selecting terminal, manual select circuit means responsive to said control means being set to said second link selecting terminal to connect said output line to said second input signal means and to said third output signal means, and disconnect said second output signal means from said direct digital control select circuit means alternate control terminal and connect said output line to said autotrak line, and further responsive to said control means being set to either said first or second link selecting terminal to disconnect all connections and connect all disconnections made when said control means was set to said third link selecting terminal, and set point means in said second independent control link supplying a set point signal, a condition indicating signal line for carrying a signal indicative of a process being controlled, analog select circuit means responsive to said control means being set to said third link selecting terminal to connect said second input signal means first terminal to said condition indicating signal line for receiving said condition indicating signal, connect said second input signal means second terminal to said set point means for receiving said set point signal, and further responsive to said control means being set to either said first or third link selecting terminals to disconnect the connections made when said control means was set to said second link selecting terminal and to connect said second input signal means terminals respectively to said second output signal means and said autotrak line.

References Cited

UNITED STATES PATENTS

| | | | |
|---|---|---|---|
| 3,290,563 | 12/1966 | Hyer et al. | 330—51UX |
| 3,422,327 | 1/1969 | McBrayer et al. | 318—20.070UX |
| 3,443,235 | 5/1969 | Newbold | 330—51X |

DONALD J. YUSKO, Primary Examiner

U.S. Cl. X.R.

330—51